US005465109A

United States Patent [19]

Bowers

[11] Patent Number: 5,465,109

[45] Date of Patent: Nov. 7, 1995

[54] DIGITAL PHASE LOCK LOOP STIMULATION GENERATOR

[75] Inventor: Mark C. Bowers, Vandalia, Ohio

[73] Assignee: Scitex Digital Printing, Inc., Dayton, Ohio

[21] Appl. No.: 796,490

[22] Filed: Nov. 22, 1991

[51] Int. Cl.[6] .................. G01D 15/18

[52] U.S. Cl. .................. 347/74

[58] Field of Search .................. 346/75; 347/14, 347/74

[56] References Cited

U.S. PATENT DOCUMENTS 4,473,830 9/1984 Piatt et al. .................. 346/75

4,897,666 1/1990 Katerberg et al. .................. 346/75 X 4,999,647 3/1991 Wood et al. .................. 346/75

*Primary Examiner*—Peter S. Wong

*Assistant Examiner*—Randy W. Gibson

*Attorney, Agent, or Firm*—Barbara Joan Haushalter

[57] ABSTRACT

A system for controlling the formation of droplets in a fluid stream includes a continuously flowing fluid stream through a droplet generator. The system further includes both a sinusoidal drive voltage at a predetermined frequency and a plurality of piezo electric crystals for causing the droplet generator to resonate and inducing a series of uniformly sized droplets to separate at regular intervals from the droplet generator. Finally, the system includes a drive signal for adjusting to the resonance of the droplet generator to control the formation of the droplets. The drive signal is applied to the crystals by a digital phase lock loop.

21 Claims, 2 Drawing Sheets

DIGITAL PHASE LOCK LOOP STIMULATION GENERATOR

TECHNICAL FIELD

The present invention relates to ink jet printing systems and, more particularly, to a digital phase lock loop stimulation generator for controlling the formation of ink droplets from an ink jet printing system.

BACKGROUND ART

Ink jet printing systems are known in which a print head defines one or more rows of orifices which receive an electrically conductive recording fluid, such as for instance a water base ink, from a pressurized fluid supply manifold and eject the fluid in rows of parallel streams. Printers using such print heads accomplish graphic reproduction by selectively charging and deflecting the drops in each of the streams and depositing at least some of the drops on a print receiving medium, while others of the drops strike a drop catcher device.

In one type of ink jet printer, the print head includes a manifold, defining a fluid receiving reservoir, to which is bonded a relatively thin orifice plate, defining the rows of orifices. The orifice plate is made of stainless steel or nickel coated with beryllium-copper and is somewhat flexible. The orifice plate is bonded to the manifold at the periphery of the orifice plate such that it bridges and closes the manifold opening leading to the reservoir. As a consequence, the orifices in the orifice plate are in direct fluid communication with the reservoir.

As fluid is applied under pressure to the fluid receiving reservoir, it flows through the orifices and emerges from each orifice as a fluid filament. The fluid filament then breaks at its tip into a succession of fluid drops. Left to natural stimulating disturbances, the filaments would break up erratically into drops of various sizes at irregular intervals. As can be appreciated, in order to provide precise charging of the drops as they are formed, it is important that the drop breakup process be uniform and that drops of substantially constant size and spacing are formed in each stream.

In order to produce such uniform breakup of the fluid filaments, it is known to vibrate the orifice plate with an electromechanical transducer, such as a piezoelectric transducer, thus producing a series of blending waves which flex the plate. These waves cause vibration, producing pressure varicosities in the fluid filaments emerging from the orifices, and resulting in drops of relatively uniform size and spacing being formed from the fluid filaments.

In one known system for creating drops of relatively uniform size and spacing, an analog phase lock loop (PLL) generator is used. However, analog stimulation generators require the use of precision components, which are expensive and sensitive to temperature changes. Also, the analog phase lock loop requires manual adjustment of the voltage controlled oscillator of the PLL by an operator.

It will be appreciated that it is desirable to precisely control the amount of vibration. A problem has been noted, however, in that the amplitude of the mechanical vibrations required for optimum stimulation has been found not to be uniform. The amplitude of the mechanical vibrations are sensitive to ambient temperature variations, and the tuned elements used to generate vibrations are subject to many variations. Thus, stimulating each of a number of orifice plates or print heads with a transducer driven at a single vibrational amplitude level results in at least some of the print heads producing jet drop streams which are either over stimulated or under stimulated. As a consequence, the ink drop breakup process lacks uniformity.

It is seen then that there exists a need for a stimulation generator which provides optimum stimulation over an extended period of operation without the need for operator adjustments.

SUMMARY OF THE INVENTION

This need is met by the system according to the present invention, wherein a digital phase lock loop is used on a stimulation generator to track the resonant frequency of a stimulation transducer, where the resonant frequency is the optimum drive frequency for the transducer.

In accordance with one aspect of the present invention, a printing system for controlling the formation of droplets in a fluid stream comprises means for generating a continuously flowing fluid stream through a droplet generator. The system further includes a stimulation means for causing the droplet generator to resonate and inducing a series of uniformly sized droplets to separate at regular intervals from the droplet generator. Finally, the system includes means for applying a drive signal for adjusting the stimulation means to control the formation of the droplets. The drive signal is applied to the crystals by a digital phase lock loop.

The present invention also provides for a method of controlling the formation of droplets in a fluid stream. The method comprises the steps of generating a continuously flowing fluid stream through a droplet generator and applying a sinusoidal drive voltage to the droplet generator for causing the droplet generator to resonate and the fluid stream to break up into droplets. The method further includes the steps of monitoring a sinusoidal tab feedback to provide a measure of the resonance of the droplet generator and using a digital phase lock loop for tracking a desired phase relationship between the drive voltage and the tab feedback.

Accordingly, it is an object of the present invention to provide a digital phase lock loop stimulation generator which is capable of providing optimum stimulation over an extended period of operation. It is an advantage of the present invention that the phase lock loop center frequency is selected by the choice of a stable frequency source, so manual adjustment of the center frequency of the phase lock loop is not required. Furthermore, the frequency is selectable over a wide range without requiring circuit changes, making the circuit extremely versatile. Finally, since the digital stimulation generator of the present invention has fewer analog functions than an analog stimulation generator, the design of the present invention is advantageous in that it is inherently less sensitive to ambient temperature variations, since analog components tend to drift with temperature.

Other objects and advantages of the invention will be apparent from the following description, the accompanying drawings and the appended claims.

DETAILED DESCRIPTION OF THE PREFERRED EMBODIMENTS

Figure 1:
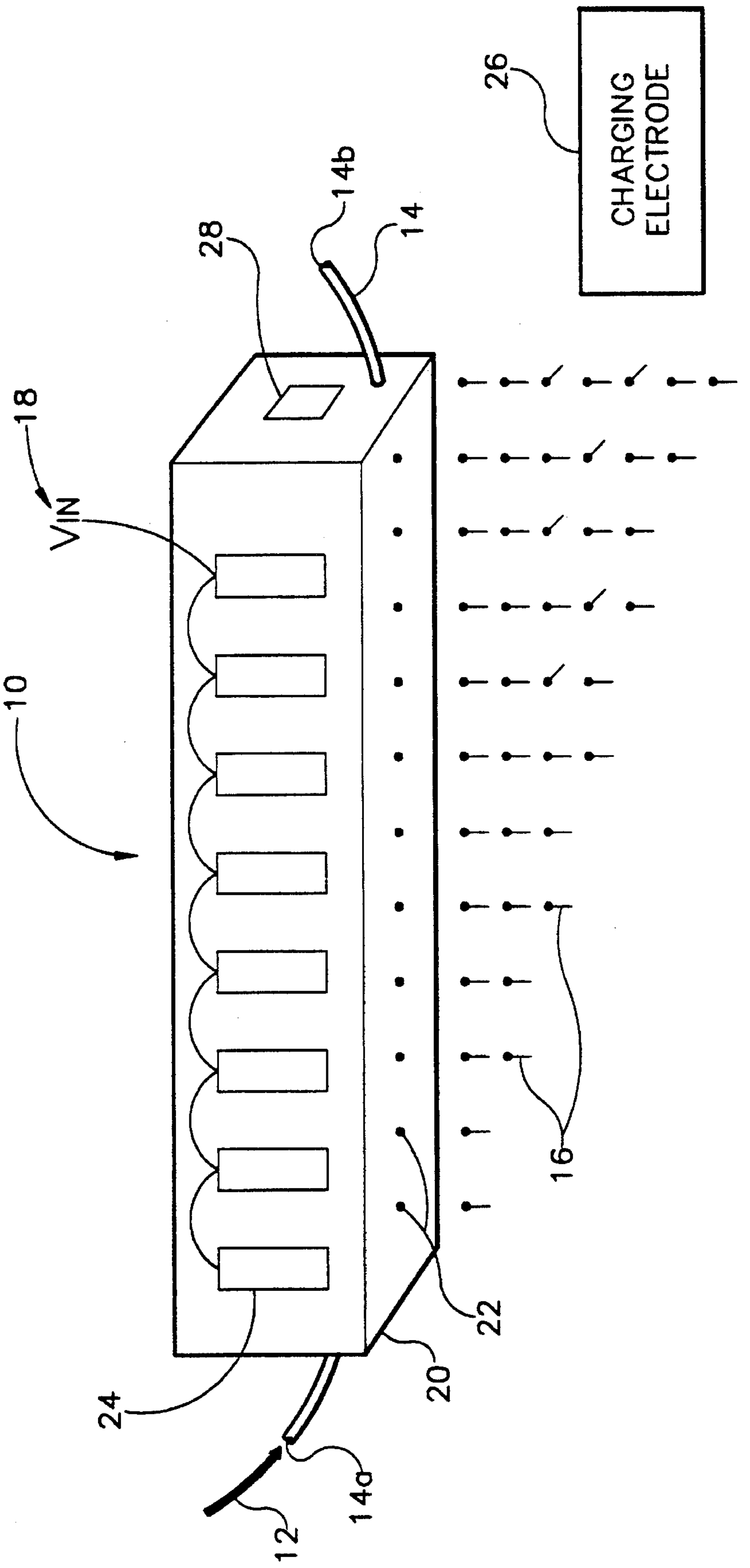
FIG. 1 is a side view of a digital phase lock loop stimulation generator of the present invention.

The present invention provides a system and a method for controlling the formation of droplets in a fluid stream. As seen in FIG. 1, in a droplet generator 10, a continuously flowing fluid stream 12 is applied through the droplet generator 10 via tubing 14. The fluid 12, typically ink, enters the tubing 14 at input 14*a*. The droplet generator is stimulated to cause a series of uniformly sized fluid droplets 16 to separate at regular intervals as the fluid 12 passes through the droplet generator 10, and emerge through an orifice plate 18 having a plurality of orifices 20. The fluid 12 that did not separate into droplets 16 then exits the tubing 14 at output 14*b*.

Continuing with FIG. 1, the droplet generator is stimulated by a sinusoidal drive voltage which is applied to the droplet generator 10 at input 22 through a plurality of piezo electric crystals 24. The crystals 24, preferably mounted on the front and back sides of the droplet generator 10, expand and contract as the drive voltage increases and decreases, causing the droplet generator 10 to resonate. This resonance causes the fluid 12 to break up into droplets 16. A charging electrode 26, situated below and to one side of the droplet generator 10, charges selected droplets 16. The charged droplets 16 are then caught or otherwise deflected from the drip path, leaving only enough droplets 16 to result in a selected droplet formation. The droplet charging process controls an optimum charging of the droplets 16 by determining a start time and a duration of each charging pulse to correspond to the desired droplet formation, based on timing signals provided by a digital phase lock loop integrated circuit 30, in FIG. 2.

A sinusoidal tab feedback is monitored and output from feedback crystals 28 to provide a measure of the resonance of the droplet generator 10, which also provides a means to indirectly measure the droplet formation, or efficiency, of the droplet generator 10. A magnitude and phase relationship between the drive voltage being applied at input 18 and the tab feedback being monitored at the feedback crystals 28 can then be determined. In a preferred embodiment of the present invention, an optimum phase relationship between the drive voltage and the tab feedback of ninety degrees out of phase results in an optimum mechanical resonant frequency of the droplet generator 10. Therefore, a drive signal is applied to the crystals 24 for adjusting the frequency until the drive voltage and the tab feedback are ninety degrees out of phase. The means for applying the drive signal is the digital phase lock loop integrated circuit 30, shown in FIG. 2. The center frequency of the phase lock loop 30 is set by a crystal oscillator, ordered according to the required frequency, so tuned elements are not needed in the circuit of FIG. 2. Also, since the phase lock loop 30 center frequency is selected by the choice of a stable frequency source, the frequency is not subject to temperature drifts and manual adjustment of the center frequency of the phase lock loop is not required. Furthermore, the frequency is selectable over a wide range without requiring circuit changes in the block diagram of FIG. 2.

Figure 2:
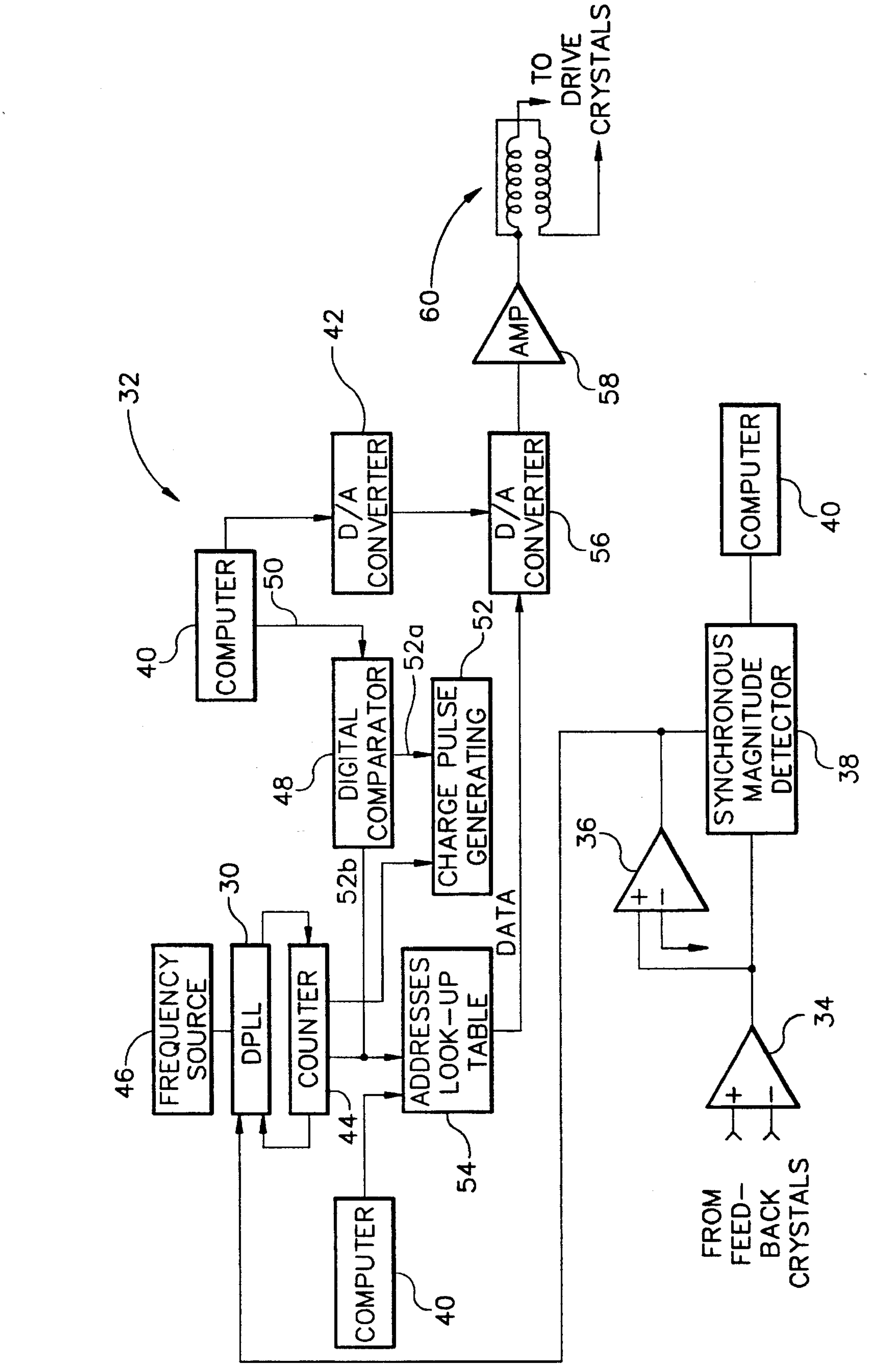
FIG. 2 is a block diagram illustrating the stimulation generator control electronics.

Referring now to FIG. 2, there is illustrated a block diagram 32 of the droplet generator 10 control electronics. In FIG. 2, the droplet generator 10 resonance from the feedback crystals 28 is continuously cycled through a buffer amplifier 34 and applied to a zero crossover detector or voltage comparator 36, resulting in a square wave. The square wave signal is applied to a synchronous magnitude detector 38 which results in the tab feedback magnitude being portrayed as a full wave rectifier. The tab feedback magnitude from detector 38 is then provided as an analog input to a controller, such as a computer 40, for controlling the system. The computer 40 then adjusts the drive voltage to achieve optimum droplet generation. Adjustment of the drive voltage is important because when the droplet generator 10 is calibrated, a particular drive voltage at a particular tab feedback magnitude is found to provide the optimum droplet generation. The drive voltage is adjusted by the computer to achieve that particular tab feedback magnitude and drive voltage phase relationship. Any digitally selectable means, including the computer 40, may be used to change the phase relationship between the drive voltage and the tab feedback magnitude. The phase relationship between the drive voltage and the tab feedback magnitude is tracked by the digital phase lock loop integrated circuit 30.

The computed magnitude of the drive voltage is then provided by the computer 40 as a digital output of the full wave rectified magnitude of the tab feedback to a digital-to-analog converter 42. The converter 42 then provides a multiplier input, which is the magnitude of the drive voltage sine wave, to a digital-to-analog converter 56. The drive voltage can be selected using any suitable means, including a closed loop feedback algorithm wherein the tab feedback is monitored and the drive voltage is adjusted according to the tab feedback. The computer 40, then, forms a closed loop control of the magnitude of the tab feedback, resulting in fewer analog components, thereby avoiding analog compensation errors.

Continuing with FIG. 2, the square wave signal from the zero crossover detector 36 is also applied to the digital phase lock loop integrated circuit 30 and is continuously cycled through an eight-bit counter 44 back to the digital phase lock loop integrated circuit 30. The digital phase lock loop integrated circuit 30 may be any suitable chip such as a 74HC/HCT297 manufactured by Signetics Corporation, which includes a voltage controlled oscillator or an assembly of digital logic integrated circuits which duplicate the function. The digital phase lock loop integrated circuit 30, therefore, adjusts the output or drive frequency such that the square wave input signal from the comparator 36 is ninety degrees out of phase with the output of the counter 44. A frequency source 46, also being applied to the digital phase lock loop integrated circuit 30, is preferably a crystal oscillator 46 for setting the center frequency of the digital phase lock loop integrated circuit 30. Since the circuit 32 is not tuned to a specific crystal oscillator, the crystal oscillator 46 may be changed to provide the desired center frequency. This permits wide latitude of the frequency of the drive output. Having the ability to select different crystals, without circuit modifications, allows operation of the digital phase lock loop integrated circuit 30 over a wide range of frequencies. The crystal oscillator 46 is commercially available, eliminating the need for operator adjustment or tuned elements to generate an exact and stable frequency source.

The output from the counter 44 is also applied to a digital comparator 48, where the actual drive voltage phase signal from the counter 44 is compared to a digitally output computer selected phase signal along line 50, from computer 40. This information is important for synchronizing the charging of the charging electrode 26 of FIG. 1 in order to control droplet formation. Since the droplets 16 tend to separate from the fluid 12 at a particular location along the drive voltage sine wave, it is important to start the charging process from the charging electrode 26 at that particular location. The digital comparator 48 provides information on where along the drive voltage sine wave the system 32 is currently operating. When the actual drive voltage phase signal matches the computer selected phase signal, the digital comparator 48 outputs an "at phase" signal 52*a*. The "at phase" signal 52*a* occurs when the system 32 is at that location on the drive voltage sine wave where the charging process of the charging electrode 26 should be initiated for optimum droplet formation. Hence, the start of the droplet charging time can be created from the counter 44. Further, the counter 44 provides signal pulses 52*b* which are multiples of the digital phase lock loop frequency to the charge pulse generating circuit 52. The charging electronics of the charge pulse generating circuit 52 count a prespecified number of pulses to create a charge pulse of specific duration related to the period of the drive output sine wave generation. A charge pulse may then be started when the "at phase" signal is achieved. The number of pulses is counted, allowing a printing system to fix a charge pulse length and relate the fixed length to the driving frequency of the droplet generator 10. Hence, the length of the charge pulse changes with the drive frequency of the droplet generator.

Continuing with FIG. 2, the output of the counter 44 is also cycled through a sine wave look-up table memory integrated circuit 54. The computer 40 digitally outputs higher order addresses for the memory 54, which allows selection of different magnitude/phase sine wave tables. For example, if a drop generator requires a drive/feedback relationship of other than ninety degrees, then the appropriate table may be selected. Additionally, not only can the phase be adjusted by altering the look-up table in memory 54, but the magnitude of the sine wave can be varied by changing the look-up table in memory 54.

As the output from the counter 44 is continuously cycled through addresses in the memory integrated circuit 54, a series of digital numbers is provided which correspond to a particular phase of a sine wave. The digital numbers from the memory 54, along with the drive magnitude signal from the converter 42, are output to the digital-to-analog converter 56 to generate a sine wave. This sine wave signal is output to an ac power amplifier 58 to amplify the power before providing the sine wave signal to a balum transformer 60. The balum transformer 60 then outputs the drive voltage applied to the crystals 24 of FIG. 1. The balum transformer 60 provides the advantage of boosting or doubling the drive voltage which allows the crystals 24 to be at a higher voltage level. This transformer output guarantees the higher voltages without the penalty of requiring the power amplifier 58 to be designed with higher voltage power supplies.

The present invention provides for a system and a method for controlling the formation of droplets in a fluid stream. A sinusoidal drive voltage and a plurality of crystals cause the droplet generator to resonate, inducing a series of uniformly sized droplets to separate at regular intervals from the droplet generator. A drive signal adjusts the resonance of the droplet generator to control the formation of the droplets. The drive signal is applied to the crystals by a digital phase lock loop.

Having described the invention in detail and by reference to the preferred embodiment thereof, it will be apparent that other modifications and variations are possible without departing from the scope of the invention defined in the appended claims.

What is claimed is:

1. In a printing system, a method of controlling the formation of droplets in a fluid stream, said method comprising the steps of:

generating a continuously flowing fluid stream through a droplet generator;

applying a drive voltage to said droplet generator for causing said droplet generator to resonate and said fluid stream to break up into droplets;

monitoring a tab feedback voltage to provide a measure of the resonance of said droplet generator; and using a digital phase lock loop for setting a center frequency of said digital phase lock loop with a crystal oscillator and for tracking a desired phase relationship between said drive voltage and said tab feedback voltage to control the formation of said droplets.

2. A printing system as claimed in claim 1 wherein said fluid stream is an ink stream.

3. A printing system as claimed in claim 1 wherein said droplet generator further comprises an orifice plate having a plurality of orifices through which said droplets emerge.

4. A printing system as claimed in claim 1 wherein said step of applying a drive voltage to said droplet generator further comprises the step of mounting a plurality of piezo electric crystals on said droplet generator which expand and contract as said drive voltage changes, causing said droplet generator to resonate.

5. A printing system as claimed in claim 1 wherein said step of monitoring a tab feedback voltage further comprises the step of using a computer for monitoring said tab feedback voltage.

6. A printing system as claimed in claim 5 wherein said step of using a computer further comprises the step of using said computer for adjusting said drive voltage.

7. A printing system as claimed in claim 1 wherein said step of using a digital phase lock loop further comprises the step of generating timing signals for a droplet charging process.

8. A printing system as claimed in claim 7 wherein said droplet charging process controls deflection of said droplets.

9. A printing system as claimed in claim 8 wherein said droplet charging process further comprises means for determining a start time and a duration of a charging pulse.

10. A printing system as claimed in claim 1 further comprising the step of determining an optimum drive frequency of said droplet generator based on said phase relationship between said drive voltage and said tab feedback voltage.

11. A printing system as claimed in claim 1 wherein said crystal oscillator may be replaced with any of a plurality of crystal oscillators for allowing a wider frequency output for said drive voltage.

12. A printing system as claimed in claim 1 wherein said phase relationship comprises said tab voltage being ninety degrees out of phase with said drive voltage.

13. A printing system as claimed in claim 1 further comprising the step of using digitally selectable means for changing said phase relationship between said drive voltage and said tab feedback voltage.

14. A printing system for controlling the formation of droplets in a fluid stream comprising:

means for generating a continuously flowing fluid stream through a droplet generator;

stimulation means for causing a series of uniformly sized droplets to separate at regular intervals from said droplet generator; and a digital phase lock loop having a center frequency set with a crystal oscillator and capable of applying a drive signal to said stimulation means for controlling the formation of said droplets.

15. A printing system as claimed in claim 14 wherein said means for applying a drive signal further comprises means for applying said drive signal to adjust said stimulation means.

16. A printing system as claimed in claim 14 wherein said stimulation means comprises:

a drive voltage at a predetermined frequency; and a plurality of piezo electric crystals mounted on said droplet generator for causing said droplet generator to resonate.

17. A printing system as claimed in claim 15 further comprising means for monitoring a tab feedback voltage to provide a measure of the resonance of said droplet generator.

18. A printing system as claimed in claim 17 further comprising means for monitoring a phase relationship between said drive voltage and said tab feedback voltage.

19. A printing system as claimed in claim 18 wherein said phase relationship comprises said tab feedback voltage being ninety degrees out of phase with said drive voltage.

20. A printing system as claimed in claim 14 wherein said fluid stream is an ink stream.

21. A printing system as claimed in claim 14 wherein said droplet generator further comprises an orifice plate having a plurality of orifices through which said droplets are expelled.

* * * * *